(12) United States Patent
Hoy et al.

(10) Patent No.: US 9,441,143 B2
(45) Date of Patent: Sep. 13, 2016

(54) WATERBORNE ADHESIVES FOR ELASTOMERS

(71) Applicant: Rohm and Haas Company, Philadelphia, PA (US)

(72) Inventors: Dean E. Hoy, West Alexandria, OH (US); James P. Weir, Miamisburg, OH (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/709,962

(22) Filed: May 12, 2015

(65) Prior Publication Data

US 2015/0247072 A1 Sep. 3, 2015

Related U.S. Application Data

(62) Division of application No. 11/982,374, filed on Nov. 1, 2007, now Pat. No. 9,328,270.

(60) Provisional application No. 60/859,228, filed on Nov. 15, 2006.

(51) Int. Cl.

| C08K 5/1515 | (2006.01) |
|---|---|
| C09J 147/00 | (2006.01) |
| C09J 123/28 | (2006.01) |
| C09J 123/34 | (2006.01) |
| C09J 9/00 | (2006.01) |
| C08L 63/04 | (2006.01) |
| C09J 109/10 | (2006.01) |
| C08L 15/02 | (2006.01) |
| C08L 23/34 | (2006.01) |
| C08L 63/00 | (2006.01) |
| C09J 115/02 | (2006.01) |

(52) U.S. Cl.
CPC ............... *C09J 147/00* (2013.01); *C09J 9/00* (2013.01); *C09J 123/28* (2013.01); *C09J 123/286* (2013.01); *C09J 123/34* (2013.01); *C08K 5/1515* (2013.01); *C08L 15/02* (2013.01); *C08L 23/34* (2013.01); *C08L 63/00* (2013.01); *C08L 63/04* (2013.01); *C09J 109/10* (2013.01); *C09J 115/02* (2013.01); *Y10T 428/31692* (2015.04)

(58) Field of Classification Search
CPC ..... C09J 115/02; C09J 123/28; C09J 123/34; C08L 15/02; C08L 23/34
See application file for complete search history.

(56) References Cited

U.S. PATENT DOCUMENTS

| 2,725,373 | A | | 11/1955 | Reynolds | |
|---|---|---|---|---|---|
| 5,028,654 | A | * | 7/1991 | Wuest | C08J 5/124 524/259 |
| 5,162,156 | A | * | 11/1992 | Troughton, Jr. | C08G 8/20 156/315 |
| 5,496,884 | A | * | 3/1996 | Weih | C08F 36/04 524/459 |
| 5,534,591 | A | * | 7/1996 | Ozawa | C09J 123/28 525/194 |
| 5,717,031 | A | | 2/1998 | Degan | |
| 6,512,039 | B1 | | 1/2003 | Mowrey | |
| 6,841,600 | B2 | | 1/2005 | Green | |
| 7,144,630 | B2 | | 12/2006 | Jazenski | |
| 2003/0158338 | A1 | * | 8/2003 | Jazenski | C08L 63/00 525/107 |
| 2004/0176533 | A1 | | 9/2004 | Kucera et al. | |

FOREIGN PATENT DOCUMENTS

| EP | 1333057 | 8/2003 |
|---|---|---|
| GB | 2078770 | 1/1982 |
| GB | 2155488 | 9/1985 |
| WO | 9823660 | 6/1998 |
| WO | 03033613 | 4/2003 |

OTHER PUBLICATIONS

Ullman's Encyclopedia of Industrial Chemistry, "Rubber," Chemie Publishers, 14th ed., vol. 13, p. 662, 1972.

* cited by examiner

*Primary Examiner* — Richard A Huhn
(74) *Attorney, Agent, or Firm* — Carl P. Hemenway

(57) ABSTRACT

There is provided a process for forming a waterborne adhesive composition comprising the steps of
  A. forming a solution in organic solvent comprising
    (a) one or more bromine substituted olefin polymer,
    (b) one or more halosulfonated olefin polymer,
    (c) one or more epoxy resin,
  B. adding water to said solution to form an oil in water emulsion, and
  C. then removing said organic solvent.

12 Claims, No Drawings

WATERBORNE ADHESIVES FOR ELASTOMERS

This application claims the benefit of priority under 35 U.S.C. §119(e) of U.S. Provisional Patent Application No. 60/859,228 filed on Nov. 15, 2006.

BACKGROUND

One useful class of materials is elastomer-bonding compositions (i.e., compositions that are capable of bonding to elastomer substrates). In some situations, it is useful to find elastomer-bonding compositions that are waterborne. Various polymers are known to be useful in one or more specific formulations that are capable of bonding to elastomer substrates. For example, US 2003/0158338 describes aqueous compositions useful for adhering elastomers to other substrates and lists a variety of polymers that may be included in such a composition, including halogen-substituted olefin polymers and sulfonyl halide-substituted olefin polymers.

It is desired to make elastomer-bonding compositions that contain blends of two or more different polymers. In some cases, a blend of two or more different polymers is desired because each polymer, when used alone, provides some specific benefit to an elastomer-bonding composition. However, it has been discovered that when some of such blends are made, the resulting composition has poor shelf stability. For example, it is expected that blends of bromine substituted olefin polymer and halosulfonated olefin polymer will sometimes have poor shelf stability. It is known, for example, that solvent based adhesives that are blends of mixed-halogen substituted olefin polymer and halosulfonated olefin polymer sometimes have poor shelf stability. Likewise, it has been discovered that waterborne blends of mixed-halogen substituted olefin polymer and halosulfonated olefin polymer sometimes have poor shelf stability. It is desired to provide waterborne compositions that contain both bromine substituted olefin polymer and halosulfonated olefin polymer and that have improved shelf stability.

STATEMENT OF THE INVENTION

In one aspect of the present invention, there is provided a waterborne adhesive composition comprising
(a) one or more bromine substituted olefin polymer,
(b) one or more halosulfonated olefin polymer,
(c) one or more compatibilizer selected from the group consisting of epoxy resins, phenolic resins, chlorinated polyolefin, and mixtures thereof.

DETAILED DESCRIPTION

A waterborne composition is a composition that contains water and other ingredients. In a waterborne composition, the ingredients other than water are dissolved in the water or dispersed in the water or a combination thereof. A specific ingredient other than water may be dissolved in the water or dispersed in the water or a combination thereof. If two or more ingredients other than water are present, there may be any combination of dissolved ingredients or dispersed ingredients or combination thereof. For example, if any two ingredients other than water are considered, both ingredients other than water may be dispersed; or one ingredient other than water may be dissolved while the other ingredient other than water may be dispersed; or one ingredient other than water may be both dissolved and dispersed while the other ingredient other than water may be dissolved or dispersed or both dissolved and dispersed.

An ingredient that is dispersed in water is in the form of discrete particles distributed throughout the water. The distribution of particles in water may be in any form, such as, for example, a dispersion, a suspension, an emulsion, a latex, or a combination thereof. The discrete particles may be solid, liquid, or a combination thereof. Independently, the discrete particles may form a colloid or other form of distribution.

In some embodiments, the practice of the present invention involves contacting a layer of an adhesive composition with an elastomer substrate. The elastomer substrate used in the practice of the present invention may be any of a wide variety of elastic materials. Elastomers are well known in the art. One description can be found in *Textbook of Polymer Science*, second edition, by F. W. Billmeyer Jr., Wiley-Interscience, 1971. As described by Billmeyer, elastomers are materials that stretch under tension to a new length that is generally at least 1.1 times their original length and may be many times their original length; they exhibit relatively high strength and stiffness when stretched; after deformation, they tend to recover their original shapes relatively quickly, with relatively little residual permanent deformation. For purposes of the present invention, materials exhibiting most or all of these characteristics will be considered "elastomers." Elastomers can be made from a wide variety of materials, such as for example natural rubber and synthetic rubber. Synthetic rubbers include, for example, polybutadiene, neoprene, butyl rubber, polyisoprene, nitrile rubbers, styrene butadiene rubbers (also called SBRs), ethylene propylene diene based rubbers (some of which are called EPDM), and the like. Elastomers include both thermoplastic elastomers (also called elastoplastics or melt-processable rubbers) and crosslinked (also called vulcanized) elastomers. The present invention may be practiced to bond any elastomer. Preferred elastomers are crosslinked synthetic or natural rubbers; more preferred are crosslinked elastomers made using natural rubber.

The adhesive compositions of the present invention may be used to bond elastomers to any of a wide variety of useful materials, including for example other elastomers; non-elastomeric but flexible materials such as for example fabrics or films; and rigid materials such as plastics, engineering plastics, wood, and metal. Some compositions of the present invention work well at bonding elastomers to metal.

The practice of the present invention involves the use of olefin polymer. Olefin polymers, also called polyolefins, include polymers based on monomer molecules that are unsaturated aliphatic hydrocarbons containing one double bond per molecule. Examples of such olefin polymers are polyethylene, polypropylene, polyisobutene, polybut-1-ene, poly-4-methylpent-1-ene, and the various copolymers thereof. Also included in the class of olefin polymers are polymers based on natural rubber and polymers based on synthetic rubber such as for example polyisoprene; polybutadiene; polymers of adducts of butadiene and cyclic conjugated dienes; copolymers of butadiene and styrene; copolymers of ethylene, propylene, and dienes; copolymers of acrylonitrile and butadiene; and the various copolymers thereof. Also included in the class of olefin polymers are the polymers described above that also include one or more multiply functional monomers to provide crosslinking.

Halogenated olefin polymers have structures that are the same as those of polyolefins except that halogen atoms replace one or more of the hydrogen atoms. The halogens may be chlorine, bromine, fluorine, or a mixture thereof. The preferred halogens are chlorine, bromine, and mixtures thereof. The amount of halogen does not appear critical and can range from 3 to 70 percent by weight of the polymer.

A bromine substituted olefin polymer is a halogenated olefin polymer in which at least one halogen is bromine A bromine substituted olefin polymer may or may not contain atoms of halogens other than bromine A bromine substituted olefin polymer is known herein as a "polymer (a)."

In some embodiments, a bromine substituted olefin polymer is used that is a mixed-halogen substituted olefin polymer. A mixed-halogen substituted olefin polymer is a bromine substituted olefin polymer that contains, in addition to bromine atom or atoms, at least one halogen atom that is not bromine.

In some embodiments, a polymer (a) is used that has chlorine and bromine. Independently, in some embodiments, a polymer (a) is used that is a substituted polydiene polymer (i.e., a polymer that has the structure of a polydiene polymer in which two or more different types of halogen atoms are substituted for hydrogen atoms). In some embodiments, every polymer (a) is a substituted polydiene polymer. Suitable polydiene polymers include, for example, polybutadiene, polyisoprene, and mixtures thereof. Some suitable polydiene polymers have no monomer units that are not residues of diene molecules. In some embodiments, every polymer (a) is a substituted polydiene polymer in which there are no monomer units that are not residues of diene molecules. One suitable mixed-halogen substituted olefin polymer, for example, is brominated polydichlorobutadiene ("BPDCD").

In some embodiments, at least one polymer (a) is used that has no substituent on the polyolefin selected from nitrile, carboxyl, carboxylate ester, ether, peroxyester, or combination thereof. In some embodiments, every polymer (a) has no substituent on the polyolefin selected from nitrile, carboxyl, carboxylate ester, ether, peroxyester, or combination thereof. In some embodiments, at least one polymer (a) is used that has no substituent on the polyolefin other than halogen. In some embodiments, every polymer (a) has no substituent on the polyolefin other than halogen.

Halosulfonated olefin polymers are polymers that have the structure of olefin polymers in which some hydrogen atoms are replaced by halogen atoms and in which other hydrogen atoms are replaced by sulfonyl halide groups, which have the chemical formula $SO_2X$, where X is a halogen atom. A halosulfonated olefin polymer is known herein as a "polymer (b)." The halogens in the sulfonyl halide groups may be chlorine, bromine, fluorine, or a mixture thereof. In some embodiments, the halogens in the sulfonyl halide groups are chlorine, bromine, or a mixture thereof. In some embodiments, the halogen in the sulfonyl halide groups is chlorine. In some embodiments, every halogen in every sulfonyl halide group every polymer (b) is either chlorine or bromine. In some embodiments, every halogen in every sulfonyl halide group every polymer (b) is chlorine.

In dependently, in some embodiments, a polymer (b) is used that is a substituted EP polymer (i.e., a polymer that has the structure of an EP polymer in which sulfonyl halide groups are substituted for some hydrogen atoms). An EP polymer is a polymer that has 50 mole % or more of its monomer units chosen from ethylene or propylene or a mixture thereof. In some embodiments, every polymer (b) is a substituted EP polymer. Some suitable EP polymers are, for example, polyethylene, polypropylene, copolymers of ethylene and propylene, copolymers of ethylene and propylene and one or more diene monomer, and mixtures thereof. Some suitable halosulfonated olefin polymers include, for example, chlorosulfonated polyethylene (CSPE), chlorosulfonated polypropylene, bromosulfonated polyethylene, bromosulfonated polypropylene, and mixtures thereof. In some embodiments, every polymer (b) is selected from (CSPE), chlorosulfonated polypropylene, bromosulfonated polyethylene, bromosulfonated polypropylene, and mixtures thereof. In some embodiments, every polymer (b) is CSPE.

In some embodiments, at least one polymer (b) is used that has no substituent on the polyolefin selected from nitrile, carboxyl, carboxylate ester, ether, peroxyester, or combination thereof. In some embodiments, every polymer (b) has no substituent on the polyolefin selected from nitrile, carboxyl, carboxylate ester, ether, peroxyester, or combination thereof. In some embodiments, at least one polymer (b) is used that has no substituent on the polyolefin other than halogen and halosulfonyl group. In some embodiments, every polymer (b) has no substituent on the polyolefin other than halogen and halosulfonyl group.

In some embodiments, no significant amount of any halogenated polyolefin that is neither a polymer (a) nor a polymer (b) is present. In some embodiments, no halogenated polyolefin that is neither a polymer (a) nor a polymer (b) is present.

As used herein, a "significant amount" of an ingredient is an amount that has an effect on the performance of the composition. In some embodiments, an ingredient that is a polymer or a resin is considered to be present in a significant amount if the ratio of the dry weight of that ingredient to the sum of the dry weights of polymer (a) and polymer (b) is 0.005 or lower.

Each polymer (a) and each polymer (b), independently of each other, may be made by any method. A variety of methods are known in the art. For example, the halogen atoms and/or sulfonyl halide groups may be present on a monomer before polymerization; they may be put onto the polymer after polymerization; or both methods may be used.

In the practice of the present invention, polymer (a) and polymer (b), independently of each other, can be prepared by any of a variety of methods known in the art. The method of preparation is not critical to the present invention. Polymer (a) or polymer (b) can be either made in an aqueous form or else made in some convenient form and then converted to aqueous form. In some embodiments, a polymer (a) or a polymer (b) is made by aqueous emulsion polymerization of one or more ethylenically unsaturated monomer; the resulting polymer may, for example, be stabilized with polyvinyl alcohol, with one or more non-polymeric surfactants, or with a combination thereof.

In some embodiments, one or both of a polymer (a) or a polymer (b) is prepared as a solution in organic solvent. In such embodiments, one or both of the polymer (a) or polymer (b) may be made by solution polymerization and used in that solution, optionally with further dilution, or may be made by any method, isolated, and then dissolved in organic solvent as desired. In embodiments in which one or both of polymer (a) or polymer (b) is in the form of a solution in an organic solvent, such a solution, if desired, may then be converted to an aqueous latex. One method of converting an organic solution of a polymer to a latex is to add surfactant and water to the solution with high shear to emulsify the polymer and then strip away the solvent.

In some embodiments, at least one polymer (a) is polymerized by methods other than aqueous emulsion polymerization. In some embodiments, every polymer (a) that is present in the adhesive composition is polymerized by methods other than aqueous emulsion polymerization. Independently, in some embodiments, at least one polymer (b) is polymerized by methods other than aqueous emulsion polymerization. In some embodiments, every polymer (b) that is present in the adhesive composition is polymerized by methods other than aqueous emulsion polymerization.

In some embodiments, the waterborne composition contains discrete polymer particles dispersed in water, and at least some of such particles contain both polymer (a) and polymer (b). In some embodiments, the amount of polymer (a) that is contained in particles that contain both polymer (a) and polymer (b) is, by dry weight based on the total dry weight of polymer (a), 10% or more; or 20% or more; or 50% or more.

In some embodiments, the waterborne composition contains discrete polymer particles dispersed in water, and at least some of such particles contain all three of polymer (a), polymer (b), and compatibilizer.

In some embodiments, the ratio of the dry weight of polymer (a) to the dry weight of polymer (b) is 0.5 or higher; or 1 or higher; or 2 or higher; or 3 or higher. Independently, in some embodiments, the ratio of the dry weight of polymer (a) to the dry weight of polymer (b) is 10 or lower; or 8 or lower; or 6 or lower; or 5 or lower.

The practice of the present invention involves the use of a compatibilizer selected from epoxy resins, phenolic resins, chlorinated polyolefin, and mixtures thereof. In some embodiments, one or more compatibilizer is used that is insoluble in water. A compound is insoluble in water if less than 1 gram of that compound will dissolve in 100 grams of water at 25° C. In some embodiments, at least one compatibilizer is used that has solubility in 100 grams of water at 25° C. of 0.3 gram or less; or 0.1 gram or less; or 0.03 gram or less. In some embodiments, every compatibilizer that is used is insoluble in water.

As used herein, chlorinated polyolefin is a halogenated polyolefin in which every halogen is chlorine. One suitable chlorinated polyolefin, for example, is chlorinated polyethylene (CPE).

Independently, in some embodiments, at least one compatibilizer is used that is "solvent compatible" with one or both of polymer (a) and polymer (b). Two materials are said herein to be "solvent compatible" with each other if at least one solvent can be found in which each of those two materials is soluble at 25° C. in the amount of 1 gram or more of material per 100 grams of solvent. In some embodiments, at least one compatibilizer is used that is solvent compatible with both polymer (a) and polymer (b). In some embodiments, a solvent is used in which each of polymer (a), polymer (b), and compatibilizer is, individually, soluble in that solvent at 25° C. in the amount of 1 gram or more of material per 100 grams of solvent.

In some embodiments, the ratio of the dry weight of compatibilizer to the sum of the dry weights of polymer (a) and polymer (b) is 0.01 or higher; or 0.03 or higher; or 0.1 or higher; or 0.15 or higher; or 0.2 or higher. Independently, in some embodiments, the ratio of the dry weight of compatibilizer to the sum of the dry weights of polymer (a) and polymer (b) is 0.5 or lower; or 0.4 or lower; or 0.3 or lower.

In some embodiments, the compatibilizer includes at least one epoxy resin. In some embodiments, the composition of the present invention does not include any significant amount (as defined herein above) of phenolic resin. In some embodiments, the composition does not include any phenolic resin. Independently, in some embodiments, the composition of the present invention does not include any significant amount of chlorinated polyolefin. In some embodiments, the composition of the present invention does not include any chlorinated polyolefin.

Among embodiments in which the compatibilizer includes at least one phenolic resin, suitable phenolic resins include, for example, resorcinol type phenolic resins, novalac type phenolic resins, and mixtures thereof.

Among embodiments in which the compatibilizer includes at least one epoxy resin, suitable epoxy resin compositions include, for example, epoxy phenol-novolac, epoxy cresol-novolak, diglycidyl ethers of bisphenol A, triglycidyl isocyanurate resins, N,N,N,N-tetraglycidyl-4,4-diaminodiphenylmethane, similar resins, and mixtures thereof. In some embodiments, the compatibilizer includes one or more epoxy cresol-novolak resin.

Among embodiments in which the compatibilizer includes at least one epoxy resin, independent of the type of epoxy resin composition, the epoxy resin may usefully be characterized by its molecular weight. Some suitable epoxy resins, for example, have molecular weight of 200 or higher; or 500 or higher; or 750 or higher; or 1,000 or higher. Independently, some suitable epoxy resins, for example, have molecular weight of 5,000 or lower; or 2,500 or lower; or 2,000 or lower; or 1,500 or lower.

Among embodiments in which the compatibilizer includes at least one epoxy resin, independent of the type of epoxy resin, the epoxy resin may usefully be characterized by its epoxy value. Some suitable epoxy resins, for example, have epoxy value, in equivalents per kilogram, of 1 or higher; or 2 or higher; or 3 or higher; or 4 or higher. Independently, suitable epoxy resins, for example, have epoxy value, in equivalents per kilogram, of 8 or lower; or 7 or lower; or 6 or lower.

In some embodiments, a composition of the present invention contains one or more additional ingredients. The amount of each such ingredient is characterized by PHR, defined herein as 100 times the ratio of the dry weight of that ingredient to the sum of the dry weights of polymer (a), polymer (b), and compatibilizer.

In some embodiments, a composition of the present invention contains one or more polymeric surfactant. One suitable polymeric surfactant is, for example, polyvinyl alcohol (PVOH). Among embodiments in which polymeric surfactant is used, some suitable amounts of polymeric surfactant are, for example, 1 PHR or more; or 2 PHR or more. Independently, among embodiments in which polymeric surfactant is used, some suitable amounts of polymeric surfactant are, for example, 10 PHR or less; or 8 PHR or less; or 6 PHR or less; or 5 PHR or less.

In some embodiments, a composition of the present invention contains one or more colloid stabilizer. Some suitable colloid stabilizers, for example, are cellulose compounds, including, for example, hydroxyethyl cellulose. Among embodiments in which colloid stabilizer is used, some suitable amounts of colloid stabilizer are, for example, 0.1 PHR or more; or 0.2 PHR or more; or 0.3 PHR or more. Independently, among embodiments in which colloid stabilizer is used, some suitable amounts of colloid stabilizer are, for example, 1 PHR or less; or 0.8 PHR or less; or 0.6 PHR or less.

In some embodiments, a composition of the present invention contains one or more nonionic surfactant. Some suitable nonionic surfactants, for example, are alkoxylates, copolymers of ethylene oxide and propylene oxide, and mixtures thereof. Among the suitable alkoxylates are, for example, ethoxylates, which have the structure $$R-O-(-CH_2CH_2O-)_x-H$$

where R is an aliphatic group, an aromatic group, an aliphatic-substituted aromatic group, and aromatic-substituted aliphatic group, or a mixture thereof; and x is from 5 to 200. In some embodiments R is alkyl-substituted benzene, with the structure R1-R2-, where R1 is a linear alkyl group and R2 is an aromatic ring. One suitable nonionic surfactant is nonylphenol ethoxylate.

Among embodiments in which nonionic surfactant is used, some suitable amounts of nonionic surfactant are, for example, 3 PHR or more; or 5 PHR or more; or 8 PHR or more. Independently, among embodiments in which nonionic surfactant is used, some suitable amounts of nonionic surfactant are, for example, 30 PHR or less; or 20 PHR or less; or 15 PHR or less.

In some embodiments, a composition of the present invention contains one or more anionic surfactant. Among embodiments in which anionic surfactant is used, some suitable amounts of anionic surfactant are, for example, 3 PHR or more; or 5 PHR or more; or 8 PHR or more. Independently, among embodiments in which anionic surfactant is used, some suitable amounts of anionic surfactant are, for example, 30 PHR or less; or 20 PHR or less; or 15 PHR or less.

In some embodiments, the amount of anionic surfactant in the composition of the present invention in 0.1 PHR or less; or 0.01 PHR or less. In some embodiments, no anionic surfactant is present.

In some embodiments, a composition of the present invention contains one or more polynitroso compound or polynitroso precursor or a mixture thereof. A polynitroso compound is an aromatic hydrocarbon containing at least two nitroso groups attached directly to non-adjacent nuclear carbon atoms. By "nuclear" carbon atom we mean a carbon atom that is part of an aromatic ring. Suitable aromatic compounds may have 1 to 3 aromatic nuclei, including fused aromatic nuclei. Suitable polynitroso compounds may have 2 to 6 nitroso groups attached directly to non-adjacent nuclear carbon atoms. Also included in the class of polynitroso compounds are the substituted polynitroso compounds, in which one or more hydrogen atoms attached to nuclear carbon atoms are replaced by organic or inorganic substituent groups, such as for example alkyl, alkoxy, cycloalkyl, aryl, aralkyl, alkaryl, arylamine, arylnitroso, amino, and halogen. In some embodiments, a composition of the present invention contains one or more polynitroso compound with 2 nitroso groups.

In some embodiments, one or more polynitroso compound is used that has the chemical formula $R_m$—Ar —$(NO)_2$, where Ar is phenylene or naphthalene; R is a monovalent organic radical having 1 to 20 carbon atoms, an amino group, or a halogen; and m is 0, 1, 2, 3, or 4. If m is greater than 1, the m R groups may be the same or different from each other. R is, in some embodiments, an alkyl, cycloalkyl, aryl, aralkyl, alkaryl, arylamine, or alkoxy radical with 1 to 20 carbon atoms; or R is, in some embodiments, an alkyl group with 1 to 8 carbon atoms. Independently, in some embodiments, the value of m is zero.

Some examples of suitable polynitroso compounds are m-dinitrosobenzene; p-dinitrosobenzene; m-dinitrosonaphthalene; p-dinitrosonaphthalene; 2,5-dinitroso-p-cymene; 2-methyl-1,4-dinitrosobenzene; 2-methyl-5-chloro-1,4-dinitrosobenzene; 2-fluoro-1,4-dinitrosobenzene; 2-methoxy-1,3-dinitrosobenzene; 2-benzyl-1,4-dinitrosobenzene; 2-cyclohexyl-1,4,-dinitrosobenzene; and mixtures thereof. In some embodiments, one or more polynitroso compound is used that is selected from dinitrosobenzenes, substituted dinitrosobenzenes, dinitrosonaphthalenes, substituted dinitrosonaphthalenes, and mixtures thereof.

Also included in the class of polynitroso compounds are compounds as described above which exist in polymeric form (called "polymeric polynitroso compounds" herein), as described in Czerwinski, U.S. Pat. No. 4,308,365, and Hargis et. al., U.S. Pat. No. 5,478,654. In some embodiments, one or more polynitroso compound is used that is selected from the polymeric form of p-dinitrosobenzene, the polymeric form of 1,4-dinitrosonaphthalene, and mixtures thereof. In some embodiments, the polymeric form of 1,4-dinitrosobenzene is used.

A polynitroso precursor is a compound that is capable of a chemical reaction, at least one product of which is a polynitroso compound. Some suitable polynitroso precursors are, for example, compounds that have the structure of compounds that could be made by reduction of any of the polynitroso compounds described herein above. Some suitable precursors are, for example, substituted p-quinone dioximes, p-quinone dioxime, and mixtures thereof.

In some embodiments in which a composition of the present invention contains a polynitroso compound, polynitroso precursor, or mixture thereof, the amount of polynitroso compound, polynitroso precursor, or mixture thereof may be, for example, 0.5 PHR or more; or 1 PHR or more; or 1.5 PHR or more. Independently, in some embodiments, the amount of polynitroso compound, polynitroso precursor, or mixture thereof may be, for example, 40 PHR or less; or 15 PHR or less; or 10 PHR or less; or 5 PHR or less; or 2.5 PHR or less.

In some embodiments, a composition of the present invention contains one or more anti-corrosion pigment. Some suitable anti-corrosion pigments are, for example, lead oxide, zinc oxide, molybdate modified zinc oxide, other pigments, and mixtures thereof. In some embodiments, no anti-corrosion pigment is used. In embodiments in which an anti-corrosion pigment is present, the amount of anti-corrosion pigment may be, for example, 2 PHR or more; or 5 PHR or more; or 8 PHR or more. Independently, in embodiments in which an anti-corrosion pigment is present, the amount of anti-corrosion pigment may be, for example, 20 PHR or less; or 15 PHR or less; or 12 PHR or less.

In some embodiments, a composition of the present invention contains clay. In some embodiments, no clay is used. In embodiments in which clay is present, the amount of clay may be, for example, 2 PHR or more; or 5 PHR or more; or 8 PHR or more. Independently, in embodiments in which clay is present, the amount of clay may be, for example, 20 PHR or less; or 15 PHR or less; or 12 PHR or less.

In some embodiments, a composition of the present invention contains carbon black. In some embodiments, no carbon black is used. In embodiments in which carbon black is present, the amount of carbon black may be, for example, 2 PHR or more; or 5 PHR or more; or 8 PHR or more. Independently, in embodiments in which carbon black is present, the amount of carbon black may be, for example, 20 PHR or less; or 15 PHR or less; or 12 PHR or less.

In some embodiments, a composition of the present invention contains manganese dioxide. In some embodiments, no manganese dioxide is used. In embodiments in which manganese dioxide is present, the amount of manganese dioxide may be, for example, 5 PHR or more; or 10 PHR or more; or 20 PHR or more. Independently, in embodiments in which manganese dioxide is present, the amount of manganese dioxide may be, for example, 60 PHR or less; or 30 PHR or less.

In some embodiments, a composition of the present invention contains one or more dispersant. Dispersants, as used herein, include, for example, polymeric surfactants, polymeric colloid stabilizers, dispersants normally used dispersing for mineral pigments, anionic surfactants, nonionic surfactants, and mixtures thereof. In some embodiments, no dispersant is used. In some embodiments in which one or more dispersant is used, the amount of dispersant may be, for example, 0.5 PHR or more; or 1.0 PHR or more; or 1.5 PHR or more. Independently, in some embodiments in which one or more dispersant is used, the amount of dispersant may be, for example, 10 PHR or less; or 5 PHR or less; or 2.5 PHR or less.

In some embodiments, a composition of the present invention contains one or more amine. In some embodiments in which one or more amine is used, the amount of amine may be, for example, 0.1 PHR or more; or 0.2 PHR or more; or 0.5 PHR or more. Independently, in some embodiments in which one or more amine is used, the amount of amine may be, for example, 4 PHR or less; or 3 PHR or less; or 2 PHR or less.

The waterborne adhesive composition of the present invention may be prepared by any method. Some suitable methods, for example, involve use of a solution in organic solvent. That is, a solution in an organic solvent may be made that contains any one of, any two of, or all three of at least one polymer (a), at least one polymer (b), and at least one compatibilizer. In some embodiments, the organic solvent is not miscible with water. Independently, in some embodiments, a solvent is used that has boiling point less than 100° C. Some suitable organic solvents, for example, are aromatic and substituted aromatic compounds that are liquid at 25° C., including, for example, alkyl aromatic compounds such as, for example, benzene, toluene, or xylene.

In some embodiments that use a solution in organic solvent of one or more of polymer (a), polymer (b), and compatibilizer, such a solution is converted to a latex by a process of emulsification. In such processes, for example, one or more of the following may be added to the solution, usually while high shear rate is maintained: at least one polymeric surfactant, at least one colloid stabilizer, at least one nonionic surfactant, at least one anionic surfactant, or any combination thereof. In some emulsification processes, for example, water may then be added, usually while high shear rate is maintained. In some processes, for example, water is added slowly while high shear rate is maintained; at low levels of water, the solution becomes a water-in-oil emulsion, which converts at high enough water content to an oil-in-water emulsion. An oil-in-water emulsion may, for example, then have organic solvent removed, for example by vacuum stripping. When organic solvent is thus removed, in some embodiments, the amount of residual solvent is, by weight of solvent based on the total weight of the emulsion, 2% or less, or 1% or less, or 0.5% or less. The result of such a process has discrete particles dispersed in water; some of those particles contain one or more of polymer (a), polymer (b), compatibilizer, or a mixture thereof. A dispersion that contains discrete particles of at least one polymer dispersed in water is known herein as a latex.

High shear is normally imparted to a composition by using a device that imparts higher shear than that imparted by an ordinary mixing device. Devices that impart high shear are commonly known, for example, as emulsifiers or homogenizers. Some illustrative examples of such devices are Ross Mixer Emulsifier unit, Cowles Disperser, any inline rotor stator system, and any other equipment designed for mechanical inputting of high shear rates into a water/solvent system When organic solvent is removed from a latex, any removal method may be used. Some examples of devices that can be used for performing such removal include a stripping vessel with a foam break unit, a thin film evaporator, or any other equipment designed to extract solvent out of the finished emulsion.

In some embodiments, the waterborne adhesive composition is made by providing a latex, for example using the methods described herein above. For example, such a latex may be an "ABC latex," which is defined herein as a latex that contains at least one polymer (a), at least one polymer (b), and at least one compatibilizer.

In some embodiments involving an ABC latex, for example, the ABC latex may be mixed with one or more dispersion enhancement compounds (defined herein as polymeric surfactants, colloid stabilizers, nonionic surfactants, and anionic surfactants), in addition to any dispersion enhancement compounds that were already added to the ABC latex during the process of forming the ABC latex. In embodiments in which one or more dispersion enhancement compound is added to the ABC latex after formation of the ABC latex, the ratio of the dry weight of all dispersion enhancement compounds added to the ABC latex after formation of the ABC latex to the dry weight of all dispersion enhancement compounds added to the ABC latex during formation of the ABC latex may be, for example, zero; or 0.02 or higher; or 0.05 or higher; or 0.2 or higher; or 0.1 or higher. Independently, the ratio of the dry weight of all dispersion enhancement compounds added to the ABC latex after formation of the ABC latex to the dry weight of all dispersion enhancement compounds added to the ABC latex during formation of the ABC latex may be, for example, 2 or lower; or 1 or lower; or 0.5 or lower; or 0.25 or lower.

Independently, forming the composition of the present invention may, for example, involve mixing an ABC latex with one or more of the following: one or more polynitroso compound, one or more anti-corrosion pigment, clay, carbon black, manganese dioxide, amine, or any mixture of some or all thereof.

In some embodiments, the composition of the present invention does not contain any significant amount (as defined herein above) of any polyisocyanate. A polyisocyanate is a compound having two or more isocyanate groups. In some embodiments, the composition of the present invention does not contain any significant amount of any isocyanate compound. In some embodiments, the composition of the present invention does not contain any polyisocyanate. In some embodiments, the composition of the present invention does not contain any isocyanate compound.

In some embodiments, the waterborne adhesive composition of the present invention is used to bond two or more substrates together. For example, a layer of the waterborne adhesive composition may be applied to a first substrate. In some embodiments, the layer of adhesive composition may optionally be dried before the layer of adhesive composition is brought into contact with any additional substrate. In some embodiments, at least one additional substrate is brought into contact with the layer of adhesive composition.

In some embodiments, a first substrate is used that as metal. One suitable metal is steel. In some of such embodiments, a layer of waterborne adhesive composition is applied to the metal and then dried, optionally at temperature above 25° C. In some embodiments, a layer of an uncured rubber formulation (including green rubber, crosslinking chemicals, and, optionally, other ingredients) is then applied to the layer of (optionally dried) adhesive composition. The article thus formed, in some embodiments, is then heated above 125° C. to cure the rubber formulation.

In some embodiments, a layer of waterborne adhesive composition is applied to a metal substrate and dried. Among such embodiments, a primer may or may not be applied to the metal and dried, and then the layer of the waterborne adhesive of the present invention is applied to the layer of primer. Independently of whether a primer is used, in some embodiments involving a metal substrate, the metal substrate and the dried adhesive composition are prebaked (i.e., heated to the temperature that is appropriate for curing a particular rubber formulation). Then, after the metal substrate and the dried adhesive composition are held at that temperature for a time, a layer of that particular uncured rubber formulation is applied to the layer of dried adhesive formulation, and the article thus formed is held at that temperature for a time sufficient to cure the rubber formulation.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated. As a further, independent, example, if a particular parameter is disclosed to have suitable minima of 1, 2, and 3, and if that parameter is disclosed to have suitable maxima of 9 and 10, then all the following ranges are contemplated: 1 to 9, 1 to 10, 2 to 9, 2 to 10, 3 to 9, and 3 to 10.

EXAMPLES

Example 1

Latex

Ingredients Used in Making a Latex:

| Ingredient | Vendor and Tradename | Latex 1A Amount | Latex 1B-C Amount |
|---|---|---|---|
| Polyvinyl Alcohol (PVOH) CAS#25213-24-5 | Celanese-Celvol ™ 540 | 0.5% | 0.5% |
| Hydroxyethyl Cellulose (HEC) CAS#9004-62-0 | Dow Chemical Co. Cellosize ™ QP-100-M | 0.08% | 0.08% |
| Ethoxylated Nononyl Phenol (ENP) CAS#68649-55-8 | Rhodia-Abex ™ 100 and Abex ™ 120 | 0.55% 1.25% | 0.55% 1.25% |
| Anionic Surfactant | Lanxess-Protowet ™ D-75 | 0.17% | 0.17% |
| BPDCD | Rohm and Haas Company | 10.9% | zero |
| CSM (Chlorosulfonated polyethylene) | Dupont-Hypalon ™ 40 | 2.6% | 6.02% |
| EPOXY Resin | Ciba-Giegy - Ardalite ™ 1299 | 3.3% | zero |
| Chlorinated Polyethylene (CPE) | Nippon Paper-Superchlon ™ HE-1200 | zero | 9.06% |
| Xylene | commodity | 23.9% | 23.9% |
| Water | commodity | 56.9% | 5.4% |

Polymer Latex was Made as Follows:

a. BPDCD (40% by weight solution in Xylene) was charged into the vessel to be used to make emulsion, and the agitator was started b. With agitation, solid CSM polymer and compatibilizing polymer (in solid or liquid form, not in solution) were added and mixed at room temperature until all polymers were dissolved c. Agitation was increased to maximum for the equipment used (If Cowles mixer was used, agitation was above 3500 rpm; if a mixer emulsifier or a rotor stator was used, agitation was above 5000 rpm; no different effects were observed from using different equipment) Surfactants and colloidal stabilizing materials (the first 4 ingredients in the above list) were added to polymer solution, allowing any solid surfactants to dissolve before proceeding to next material.

d. Once all surfactants were charged and the solution was homogeneous, water was added slowly so that it was added over 60-70 minutes. Once the inversion point was reached, the water addition rate was increased. The inversion point is the point where the viscosity of the emulsion has reached a maximum with a consistency of a thick paste, and additional water, when added rapidly, reduces the viscosity. This is the point at which the emulsion goes from a water in oil emulsion to a oil in water emulsion.

e. Once all of the water was added, the batch was transferred to a stripping vessel, and the batch was then heated to 70-80° C.

f. Once batch reached the desired temperature, the pressure in the vessel was reduced to remove solvent.

Note: for emulsion 1B-C, the CSM and CPE were charged to the solvent and allowed to dissolve, and the process proceeded as described above.

Example 2

Adhesive Compositions

| | | Dry Weight Percent | | | |
|---|---|---|---|---|---|
| Ingredients | Supplier | Example 2A | Example 2B | Example 2C-C | Example 2D-C |
| Latex 1A | Example 1 | 56.85 | 66.27 | 0 | 0 |
| Latex 1B-C | Example 1 | 0 | 0 | 56.85 | 66.27 |
| polymeric dinitrosobenzene | commodity | 9.95 | 11.60 | 9.95 | 11.60 |
| Carbon Black-Raven ™ H$_2$O | Columbian Chemical Company | 5.69 | 6.63 | 5.69 | 6.63 |
| Clay-Polyplate ™ HMT | Huber | 10.00 | 6.63 | 10.0 | 6.63 |
| Molywhite 101 | Dupont | 5.69 | 6.63 | 5.69 | 6.63 |
| Dispersants* | | 1.93 | 2.15 | 1.93 | 2.15 |
| Starfactant ™ 20 polymeric Dispersant | Cognis | 0.85 | 0.99 | 0.85 | 0.99 |
| EFKA ™ 4580 Acrylic based Dispersant | EFKA | 0.85 | 0.99 | 0.85 | 0.99 |
| Marasperse ™ CBOS-3 lignosulfonate dispersant | Lignotech | 0.23 | 0.27 | 0.23 | 0.27 |
| Manganese Dioxide | Kerr McGee | 25.00 | 0 | 25.00 | 0 |

Example 3

Testing of Adhesive Formulations

Adhesive formulations were tested using the tensile button test ("button" herein) (ASTM D-429A), the 90-degree peel test ("peel" herein) (ASTM D-429B), and the prebake test (also ASTM D-429B). For the 90-degree peel test and the tensile button test, steel bars were cleaned and grit blasted, then primed with Robond™ TR-100 (Rohm and Haas Co.), then coated with adhesive formulation by spray to thickness of 0.0102 mm to 0.0152 mm (0.0004 inch to 0.0006 inch). The adhesive layer was dried at 70° C. for 10 minutes. Then a rubber layer was applied and cured as follows:

| rubber type | cure |
|---|---|
| sulfur cured SBR ("R1") | 20 minutes at 170° C. (338° F.) |
| high sulfur NR ("R2") | 20 minutes at 170° C. (338° F.) |
| semi EV NR ("R3") | 10 minutes at 160° C. (320° F.) |

Test results were as follows:

| | | Adhesive Formulation Sample No. | | | |
|---|---|---|---|---|---|
| rubber layer | Test | 2A | 2C-C | 2B | 2D-C |
| R1 | peel, in kgf/mm (lbf/inch) | 2.16 (121) | 0.10 (5.9) | 1.98 (111) | 0.66 (37) |
| R1 | prebake, kgf/mm (lbf/inch) | 0.86 (48) | 0.82 (46) | 0.75 (42) | 0.71 (40) |
| R1 | button, in MPa (psi) | 9.06 (1314) | 1.23 (178) | 9.20 (1334) | 4.61 (668) |
| R2 | peel, in kgf/mm (lbf/inch) | 2.29 (128) | 0.50 (28) | 1.57 (88) | 0.50 (28) |
| R2 | prebake, kgf/mm (lbf/inch) | 1.84 (103) | 0.93 (52) | 1.79 (100) | 0.39 (22) |
| R2 | button, in MPa (psi) | 9.62 (1395) | 3.54 (513) | 10.37 (1504) | 4.93 (715) |
| R3 | peel, in kgf/mm (lbf/inch) | 0.98 (55) | 0.70 (39) | 1.07 (60) | 0.42 (23.4) |
| R3 | prebake, kgf/mm (lbf/inch) | 0.12 (7) | 0.52 (29) | 0.12 (7) | 0.16 (9) |
| R3 | button, in MPa (psi) | 8.69 (1261) | 5.46 (792) | 8.08 (1172) | 4.45 (645) |

Sample 2A and Comparative Sample 2C-C are similar except that Comparative Sample 2C-C used typical CSM and CPE emulsion found in currently-known waterborne adhesives. Both of these two samples contained manganese dioxide. When these two samples are compared, 2A always has better peel and button results, and 2A usually has better prebake results. It is noted that Sample 2A was not compared to a hypothetical sample containing polymer (a), polymer (b), and no compatibilizer, because such a hypothetical sample is not viable in normal usage because of its poor shelf stability. Thus, Sample 2A is compared with Sample 2C-C, which contains typical CSM and CPE emulsion that is known for use in waterborne adhesives. Sample 2C-C is contemplated to represent the closest adhesive composition to Sample 2A from among previously-known compositions that are viable in normal usage. The results show that Sample 2A gave improved performance, demonstrating that polymer (a) and polymer (b) can be combined to give the benefits of both, without losing shelf stability, as shown in greater detail below.

Similarly, Sample 2B and Comparative Sample 2D-C are similar except that Comparative Sample 2D-C contains typical CSM and CPE emulsion that is known for use in waterborne adhesives. Both of these samples were made without manganese dioxide. The comparison between Sample 2B and Sample 2D-C is the same type of comparison that was made between Samples 2A and 2C-C, as discussed above. When these two samples are compared, 2B always had better peel and button results, and 2B usually had better prebake results.

Example 4

Shelf Life Testing

Stability-test sample 4A and Comparative 4B-C were made using the following ingredients. The materials were the same as those listed in Example 1.

| | Percent by dry weight: | |
|---|---|---|
| Ingredient | Sample 4A | Sample 4B-C |
| BPDCD | 56.6% | 70.6% |
| CSM | 13.5% | 16.3% |
| Epoxy resin | 16.8% | 0% |
| PVOH | 2.5% | 2.5% |
| HEC | 0.4% | 0.4% |
| Protowet ™ D-75 | 1.0% | 1.0% |
| ENP | 9.2% | 9.2% |

Each sample was used to make a latex using the procedure of Example 1. After solvent was removed, each latex was filtered, and the amount of coagulum on the filter was noted as percent weight based on the total weight of the latex (?? or is it solids weight?). The amounts of coagulum were as follows:

Latex 4A: less than 5%
Comparative Latex 4B-C: 5 to 10%.

Both latexes were stored at room temperature (20° C. to 25° C.). Each latex was tested at the time the samples were made and then at various times after that. The latexes were inspected visually to determine whether the latex remained continuous (i.e., whether coagulum had formed) after mixing, since the emulsion will form two phases over time. Also, each latex was subjected during the inspection to mechanical mixing with axial flow impeller of 3.81 cm (1.5 inch) diameter at 120 revolutions per minute, and it was noted whether or not coagulum accumulated on the mixer. Latex was characterized as "ok" if no coagulum accumulated on the mixer and the latex was homogeneous.

Results were as follows:

| Time | Latex 4A Appearance | Latex 4A Mixing | Latex 4B-C Appearance | Latex 4B-C Mixing |
|---|---|---|---|---|
| 0 days | continuous | not tested | continuous | not tested |
| 30 days | continuous | not tested | continuous | Coagulum |
| 60 days | continuous | ok | continuous | Coagulum |
| 90 days | continuous | not tested | hard coagulum settles to bottom | severe coagulum |
| 180 days | continuous | ok | | |
| 360 days | continuous | ok | | |
| 540 days | continuous | ok | | |

Latex 4A remained continuous and also stable during mixing throughout the test period. Comparative Latex 4B-C showed coagulum on mixing at 30 and 60 days. At 90 days, Comparative Latex 4B-C became useless and could not be further tested.

We claim:
1. A process for forming a waterborne adhesive composition comprising the steps of
   A. forming a solution in organic solvent comprising
      (a) one or more bromine substituted olefin polymer,
      (b) one or more halosulfonated olefin polymer,
      (c) one or more epoxy resin,

B. adding water to said solution to form an oil in water emulsion, and

C. then removing said organic solvent.

2. The process of claim 1, wherein the ratio of the dry weight of said epoxy resin to the sum of the dry weights of said polymer (a) and said polymer (b) is 0.1 or higher.

3. The process of claim 1, wherein every said bromine substituted olefin polymer in said composition is a substituted diene polymer in which there are no monomer units that are not residues of diene molecules.

4. The process of claim 1, wherein said bromine substituted olefin polymer comprises at least one mixed-halogen substituted olefin polymer.

5. The process of claim 1, wherein said halosulfonated olefin polymer comprises chlorosulfonated polyethylene.

6. The method of claim 1, wherein said organic solvent is xylene.

7. The method of claim 1, wherein said solution in organic solvent further comprises one or more surfactant.

8. The method of claim 7, wherein said surfactant comprises one or more nonionic surfactant.

9. The method of claim 8, wherein said nonionic surfactant is present in an amount of 3 PHR to 15 PHR, wherein PHR is defined as 100 times the ratio of the dry weight of said nonionic surfactant to the sum of the dry weights of said polymer (a), said polymer (b), and said epoxy resin.

10. The method of claim 1, wherein said step B is performed under high shear.

11. The method of claim 1, wherein said composition additionally comprises polyvinyl alcohol, and wherein said solution in organic solvent additionally comprises polyvinyl alcohol.

12. The method of claim 11, wherein said polyvinyl alcohol is present in an amount of 1 PHR to 10 PHR, wherein PHR is defined as 100 times the ratio of the dry weight of said polyvinyl alcohol to the sum of the dry weights of said polymer (a), said polymer (b), and said epoxy resin.

* * * * *